United States Patent
Zhao

(10) Patent No.: US 10,999,211 B2
(45) Date of Patent: May 4, 2021

(54) RESOURCE AUTHORIZATION METHOD FOR DEPLOYMENT OF VIRTUAL NETWORK FUNCTION, VIRTUAL NETWORK FUNCTION MANAGER, AND NETWORK FUNCTION VIRTUALIZATION ORCHESTRATOR

(71) Applicant: CHINA MOBILE COMMUNICATIONS GROUP CO., LTD., Beijing (CN)

(72) Inventor: Peng Zhao, Beijing (CN)

(73) Assignee: China Mobile Communications Group Co., Ltd., Beijing (CN)

(*) Notice: Subject to any disclaimer, the term of this patent is extended or adjusted under 35 U.S.C. 154(b) by 117 days.

(21) Appl. No.: 16/078,581

(22) PCT Filed: Feb. 23, 2017

(86) PCT No.: PCT/CN2017/074628
§ 371 (c)(1),
(2) Date: Aug. 21, 2018

(87) PCT Pub. No.: WO2017/143999
PCT Pub. Date: Aug. 31, 2017

(65) Prior Publication Data
US 2019/0052574 A1    Feb. 14, 2019

(30) Foreign Application Priority Data

Feb. 26, 2016   (CN) .......................... 201610109559.7
Jun. 13, 2016   (CN) .......................... 201610415011.5

(51) Int. Cl.
*G06F 15/16*   (2006.01)
*H04L 12/911*   (2013.01)
(Continued)

(52) U.S. Cl.
CPC .............. *H04L 47/70* (2013.01); *H04L 63/10* (2013.01); *H04L 67/10* (2013.01); *H04L 67/1074* (2013.01); *H04L 67/38* (2013.01)

(58) Field of Classification Search
CPC ......... H04L 47/70; H04L 63/10; H04L 67/10; H04L 67/1074; H04L 67/38
See application file for complete search history.

(56) References Cited

U.S. PATENT DOCUMENTS 10,397,352 B2 *   8/2019   I'Anson .............. H04L 41/0896
10,545,779 B2 *   1/2020   Gokurakuji ............... G06F 9/46
(Continued)

FOREIGN PATENT DOCUMENTS

CN   104348873 A   2/2015
CN   104579732 A   4/2015
(Continued)

OTHER PUBLICATIONS

International Search Report (including English translation) and Written Opinion from corresponding International Patent Application No. PCT/CN2017/074628 dated May 12, 2017, 8 pages.
(Continued)

*Primary Examiner* — Moustafa M Meky
*Assistant Examiner* — Thorne E Waugh
(74) *Attorney, Agent, or Firm* — Arch & Lake LLP

(57) ABSTRACT

The present disclosure provides a resource authorization method for deployment of a VNF, a VNFM, an NFVO, a storage medium and a device. The resource authorization method includes steps of: determining, by the VNFM, whether or not there is a resource request; in the case that there is the resource request, transmitting, by the VNFM, a resource authorization request to the NFVO; receiving, by the VNFM, a resource authorization response from the NFVO, the resource authorization response containing a
(Continued)

resource authorization result; and processing, by the VNFM, the resource authorization result.

11 Claims, 5 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 10,701,139 B2* | 6/2020 | Li | H04L 67/1008 |
| 2016/0234082 A1 | 8/2016 | Xia | |
| 2017/0012898 A1 | 1/2017 | Zhu | |
| 2017/0208147 A1* | 7/2017 | I'Anson | H04L 41/0896 |
| 2017/0257276 A1* | 9/2017 | Chou | H04L 41/0896 |
| 2018/0018192 A1* | 1/2018 | Gokurakuji | H04L 41/20 |

FOREIGN PATENT DOCUMENTS

| | | |
|---|---|---|
| CN | 105103507 A | 11/2015 |
| CN | 106161076 A | 11/2016 |
| EP | 2940968 A1 | 11/2015 |
| WO | 2015143610 A1 | 10/2015 |
| WO | 2016022698 A1 | 2/2016 |

OTHER PUBLICATIONS

Japanese Office Action (including English translation) issued in JP App. No. 2018-545385, dated Aug. 20, 2019, 9 pages.
Indian Office Action issued in IN201847032203, dated Nov. 19, 2020, 5 pages.

* cited by examiner

RESOURCE AUTHORIZATION METHOD FOR DEPLOYMENT OF VIRTUAL NETWORK FUNCTION, VIRTUAL NETWORK FUNCTION MANAGER, AND NETWORK FUNCTION VIRTUALIZATION ORCHESTRATOR

CROSS-REFERENCE TO RELATED APPLICATION

This application is the U.S. national phase of PCT Application No. PCT/CN2017/074628 filed on Feb. 23, 2017, which claims the priority to the Chinese Patent Application No. 201610109559.7 filed on Feb. 26, 2016 and the Chinese patent application 201610415011.5 filed on Jun. 13, 2016, the entire contents of which are incorporated in their entirety by reference herein for all purposes.

TECHNICAL FIELD

The present disclosure relates to the field of Network Function Virtualization (NFV) technology, in particular to a resource authorization method for deployment of a Virtual Network Function (VNF), a Virtual Network Function Manager (VNFM), a Network Function Virtualization Orchestrator (NFVO), a storage medium and a device.

BACKGROUND

In conventional NFV architecture stipulated by European Telecommunications Standards Institute (ETSI), Management and Orchestration (MANO) networking mainly includes an NFVO platform, a VNFM and a Virtual Infrastructure Management (VIM). The NFVO platform takes charge of the authorization of global resources as well as the management of a network service life circle. The VNFM takes charge of the management of a life circuit of a VNF. The VIM is configured to provide a virtual resource pool to an upper layer.

There are the following two schemes for extension in the related art. In Scheme 1, in the case that a resource authorization request is initiated by the VNFM to the NFVO, the VNFM may specify a requested resource volume. At this time, the VNFM may request resources simply but does not know the resource distribution in each resource pool, so it is impossible for the VNFM to deploy the resources in a designated resource pool as well as deploy the VNF across multiple resource pools. In Scheme 2, in the case that the resource authorization request is initiated by the VNFM to the NFVO, the VNFM may specify the requested resource volume as well as a resource pool indication parameter. In addition, in the case of performing an operation to extend the VNF, the VNFM may deploy an extended part and an original resource within an identical resource pool.

In the related art, it has been proposed that the VNFM needs to specify the requested resource volume and then initiate the resource authorization request to the NFVO. However, the global resources may probably be distributed within a plurality of resource pools, and the VNFM may not know a resource occupation condition of each resource pool. Hence, there are the following defects. In Scheme 1, in the case of initiating the resource authorization request, the VNFM does not specify the resource pool indication parameter, so the VNFM has no authority to decide the resource pool to which the requested resource belongs. In addition, the VNFM does not know the resource occupation condition of each resource pool, so it is impossible to achieve the deployment of the VNF across the resource pools. In Scheme 2, it is able to ensure the deployment of the extended part and the original VNF within the same resource pool in the case of extending the VNF. However, because the VNFM does not know the global resources within the resource pools, it is impossible to ensure that the resource is requested successfully. In addition, it is also impossible to achieve the deployment of the VNF across the resource pools.

SUMMARY

An object of the present disclosure is to provide a resource authorization method for deployment of a VNF, a VNFM, an NFVO, a storage medium and a device, so as to enable the NFVO to have authority to decide a resource pool to which a requested resource belongs, thereby to enable the VNFM to have authority to use the resource after authorization.

In one aspect, the present disclosure provides in some embodiments a resource authorization method for deployment of a VNF, including steps of: determining, by a VNFM, whether or not there is a resource request; in the case that there is the resource request, transmitting, by the VNFM, a resource authorization request to an NFVO; receiving, by the VNFM, a resource authorization response from the NFVO, the resource authorization response containing a resource authorization result; and processing, by the VNFM, the resource authorization result.

In another aspect, the present disclosure provides in some embodiments a resource authorization method for deployment of a VNF, including steps of: receiving, by an NFVO, a resource authorization request from a VNFM; determining, by the NFVO, a resource authorization result in accordance with the resource authorization request; generating, by the NFVO, a resource authorization response in accordance with the resource authorization result; and transmitting, by the NFVO, the resource authorization response to the VNFM.

In yet another aspect, the present disclosure provides in some embodiments a VNFM, including a first determination unit, a first transmission unit, a first reception unit and a processing unit. The first determination unit is configured to determine whether or not there is a resource request. The first transmission unit is configured to, in the case that there is the resource request, transmit a resource authorization request to an NFVO. The first reception unit is configured to receive a resource authorization response from the NFVO, the resource authorization response containing a resource authorization result. The processing unit is configured to process the resource authorization result.

In still yet another aspect, the present disclosure provides in some embodiments an NFVO, including a second reception unit, a second determination unit, a generation unit and a second transmission unit. The second reception unit is configured to receive a resource authorization request from a VNFM. The second determination unit is configured to determine a resource authorization result in accordance with the resource authorization request. The generation unit is configured to generate a resource authorization response in accordance with the resource authorization result. The second transmission unit is configured to transmit the resource authorization response to the VNFM.

In still yet another aspect, the present disclosure provides in some embodiments a computer storage medium storing therein a computer-executable instruction. The computer-executable instruction is executed so as to implement any of the above-mentioned resource authorization methods.

In still yet another aspect, the present disclosure provides in some embodiments a VNFM, including a first processor and a first storage medium configured to store therein a computer-executable instruction. The first processor is configured to execute the computer-executable instruction, so as to: determine whether or not there is a resource request; in the case that there is the resource request, transmit a resource authorization request to an NFVO; receive a resource authorization response from the NFVO, the resource authorization response containing a resource authorization result; and process the resource authorization result.

In still yet another aspect, the present disclosure provides in some embodiments an NFVO, including a second processor and a second storage medium configured to store therein a computer-executable instruction. The second processor is configured to execute the computer-executable instruction, so as to: receive a resource authorization request from a VNFM; determine a resource authorization result in accordance with the resource authorization request; generate a resource authorization response in accordance with the resource authorization result; and transmit the resource authorization response to the VNFM.

According to the resource authorization method for deployment of the VNF, the VNFM, the NFVO, the storage medium and device in the embodiments of the present disclosure, the VNFM determines whether or not there is the resource request. In the case that there is the resource request, the VNFM transmits the resource authorization request to the NFVO. Next, the VNFM receives the resource authorization response from the NFVO, and the resource authorization response contains the resource authorization result. Then, the VNFM processes the resource authorization result. As a result, it is able to provide the NFVO with authority to decide whether or not to authorize the resource, thereby to enable the VNFM to have authority to use the resource after authorization.

BRIEF DESCRIPTION OF THE DRAWINGS

FIG. 1-2 is a flow chart of a resource authorization method for deployment of a VNF according to one embodiment of the present disclosure;

FIG. 2 is a flow chart of another resource authorization method for deployment of a VNF according to one embodiment of the present disclosure;

DETAILED DESCRIPTION OF THE EMBODIMENTS

Figure 1:
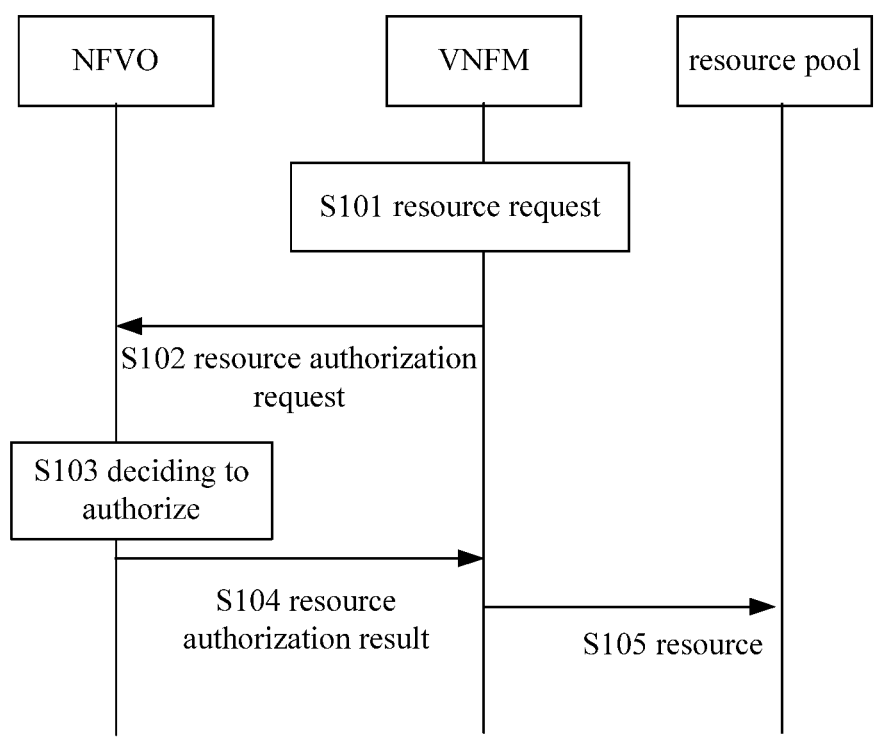
FIG. 1-1 is a flow chart of a conventional resource authorization procedure for the flexible extension of a VNF.

A conventional resource authorization procedure will be described hereinafter by taking a flexible extension procedure as an example. As shown in FIG. 1-1, the resource authorization procedure includes: Step S101 of determining, by a VNFM, that there is a resource request; Step S102 of transmitting, by the VNFM, a resource authorization request to an NFVO, the resource authorization request being used to request a resource for the flexible extension of the VNF; Step S103 of authorizing, by the NFVO, the resource in accordance with the resource authorization request; Step S104 of transmitting, by the NFVO, a resource authorization result to the VNFM (e.g., transmitting a resource authorization response carrying the resource authorization result to the VNFM); and Step S105 of allocating and calculating, by the VNFM, a resource in accordance with the resource authorization result, and transmitting the resource to a resource pool (here, the VNFM may use the resource in a corresponding resource pool in accordance with the resource authorization result).

As shown in FIG. 1-1, in the case that the VNFM needs to request the resource, it may request the NFVO to authenticate the extension of the resource through a resource authorization authentication interface. Next, the NFVO may authorize the resource authorization request for the extension, and in the case that the authorization is performed successfully, it may transmit the resource authorization response carrying an identifier indicating that the authorization is performed successfully as well as allocated resource pool identification information to the VNFM. Next, the VNFM may determine the allocated resource pool identification information in accordance with the resource authorization response. Then, the VNFM may perform a VNF extension operation in the resource pool designated by the NFVO in accordance with the resource pool identification information.

FIG. 1-1 refers to a flexible extension procedure, and it should be appreciated that, the above-mentioned method is also applicable to a scenario where a resource is newly created.

There are the following two schemes for extension in the related art. In Scheme 1, in the case that the resource authorization request is initiated by the VNFM to the NFVO, the VNFM may specify a requested resource volume but does not specify a resource pool indication parameter, so the VNFM has no authority to decide the resource pool to which the requested resource belongs. At this time, the VNFM may request the resources simply but does not know the resource distribution in each resource pool, so it is impossible for the VNFM to deploy the resources in a designated resource pool as well as deploy the VNF across multiple resource pools. In Scheme 2, in the case that the resource authorization request is initiated by the VNFM to the NFVO, the VNFM may specify the requested resource volume as well as the resource pool indication parameter. In addition, in the case of performing an operation to extend the VNF, the VNFM may deploy an extended part and an original resource within an identical resource pool. At this time, it is able to ensure the deployment of the extended part and the original VNF within the same resource pool in the case of extending the VNF. However, it is impossible to achieve the deployment of the VNF across the resource pools (because the VNFM does not know an indicator of the other resource pool).

The present disclosure will be described hereinafter in conjunction with the drawings and embodiments.

Figures 1, 2:
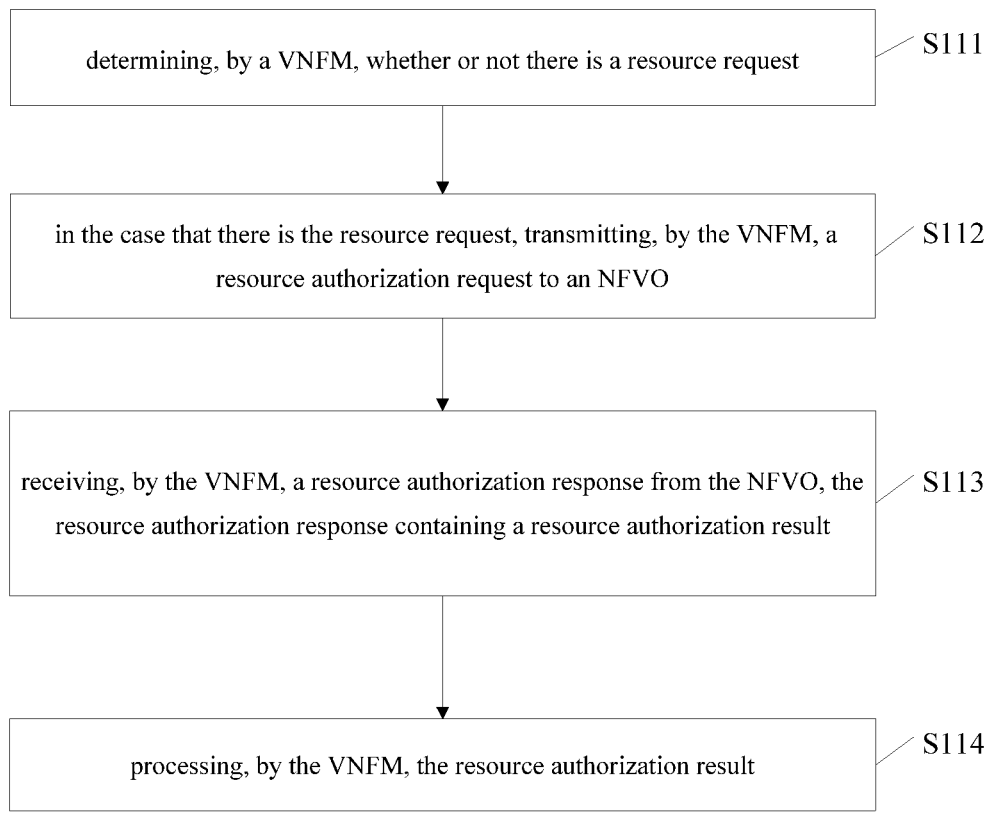
Figure 2:
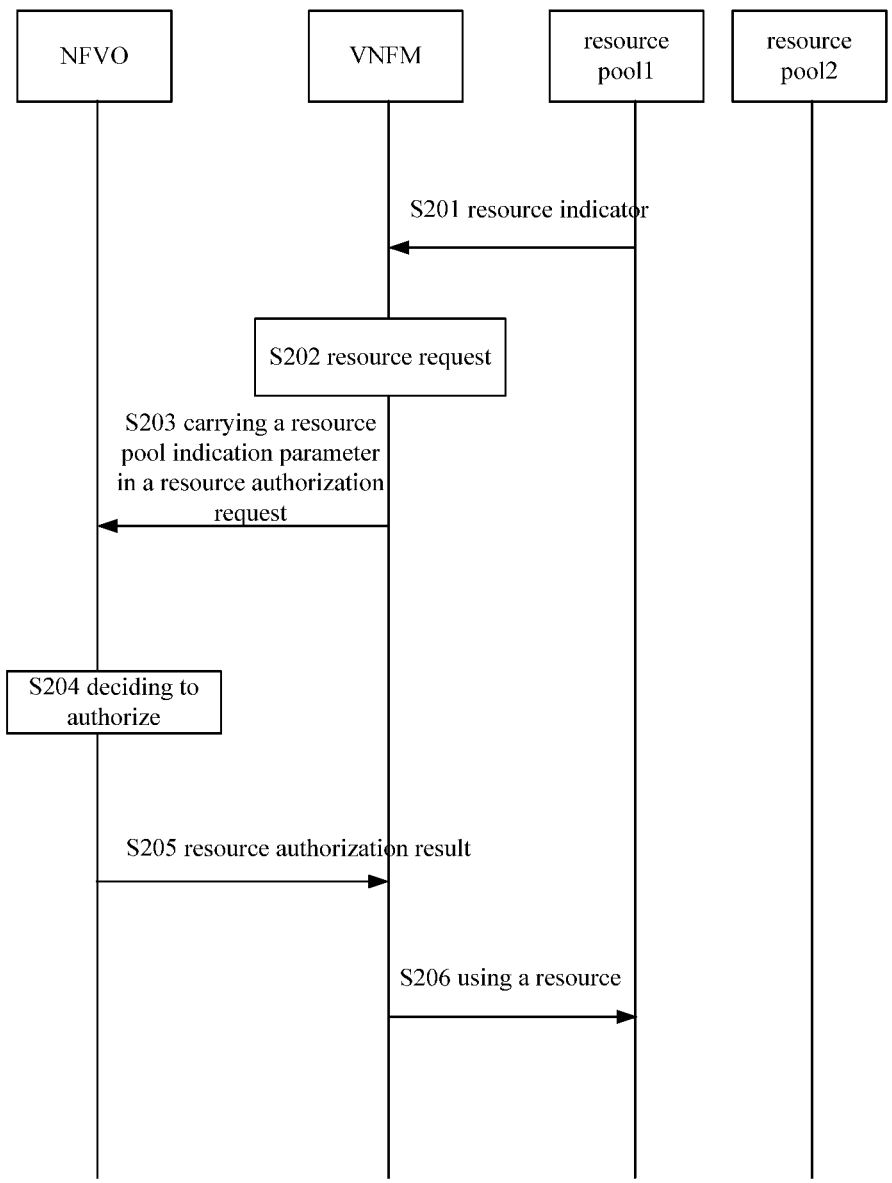

The present disclosure provides in some embodiments a resource authorization method for deployment of a VNF which, as shown in FIG. 1-2, includes the following steps.

Step S111: determining, by a VNFM, whether or not there is a resource request.

In a possible embodiment of the present disclosure, the VNFM may determine whether or not there is the resource request in the following ways. (1) The VNFM may determine whether or not there is the resource request on the basis of a manual operation, e.g., in the case that the VNF is created or extended manually, it is necessary for the VNFM to automatically request a resource at first. (2) The VNFM may determine whether or not there is the resource request on the basis of a predetermined policy. For example, the VNFM may determine whether or not there is the resource request through detecting a resource layer and an application layer and matching a policy of the VNFM itself. For another example, in the case that a load of a Central Processing Unit (CPU) is up to 80%, an automatic extension of the VNF may be triggered in accordance with the policy and relevant detection of the CPU, so as to add a new virtual machine (VM). Here, the extension is just one of the resource requests.

In another possible embodiment of the present disclosure, the resource request further contains a total amount of the requested resources, and the requested resources may include one or more of resources for the virtual machine, computational resources, storage resources, and network resources.

Step S112: in the case that there is the resource request, transmitting, by the VNFM, a resource authorization request to an NFVO. Here, an indicator of a resource pool indication parameter is carried in the resource authorization request. The indicator includes a resource pool indication parameter of resource pools of a first type or a second type. The resource pools of the first type represent resource pools to be authorized (i.e., the resource pools corresponding to the designated resource pool indication parameter), and the resource pools of the second type represent resource pools incapable of being authorized (i.e., the resource pools corresponding to an excluded resource pool indication parameter).

Step S113: receiving, by the VNFM, a resource authorization response from the NFVO, the resource authorization response containing a resource authorization result. Here, the resource authorization result is used to indicate whether or not the resource pool designated by the VNFM is to be authorized or indicate the resource pool that meets a request condition. To be specific, the resource authorization result is used to indicate whether or not a resource pool corresponding to the resource pool indication parameter designated by the VNFM is to be authorized or whether or not a resource pool other than the resource pool corresponding to the excluded resource pool indication parameter is to be authorized.

In the case that the resource pool indication parameter of the resource pools of the first type is carried in the resource authorization request transmitted from the VNFM to the NFVO in Step S112, the resource pool designated by the VNFM is just the requested resource pool of the first type. In the case that the resource pool indication parameter of the resource pools of the second type is carried in the resource authorization request transmitted from the VNFM to the NFVO in Step S112, the resource pool designated by the VNFM is just the resource pool other than the requested resource pool of the second type.

In the case that the resource authorization result indicates that the resource authorization is successful and the resource pools indicated by the resource pool indication parameter of the request resource pools of the first type have been authorized, the VNFM may use the resources in the authorized resource pools of the first type. In the case that the resource authorization result indicates that the resource authorization is successful and the resource pools other than those indicated by the resource pool indication parameter of the request resource pools of the second type have been authorized, the VNFM may use the resources in the authorized resource pools.

Step S114: processing, by the VNFM, the resource authorization result.

Here, the step of processing, by the VNFM, the resource authorization result includes, in the case that the resource authorization result indicates that the resource pools designated by the VNFM have been authorized, the VNFM may use the resources in accordance with the resource authorization result. The step of using the resources in accordance with the resource authorization result includes calculating the resources, allocating the calculated resources to the resource pool, and using the resources in the resource pool.

In a possible embodiment of the present disclosure, the step of determining whether or not there is the resource request includes: receiving a resource indicator from each resource pool, the resource indicator at least carrying identification information about the resource pool, and determining, by the VNFM, whether or not there is the resource request in accordance with the resource indicator; or determining, by the VNFM, whether or not there is the resource request in accordance with a predefined policy.

Correspondingly, the resource authorization method further includes: in the case that there is the resource request, determining, by the VNFM, the identification information about the resource pool as the resource pool indication parameter of the resource pools of the first type; and enabling, by the VNFM, the identification information about the resource pool to be carried in the resource authorization request.

The present disclosure further provides in some embodiments a resource authorization method for deployment of a VNF which includes the following steps.

Step S121: receiving, by an NFVO, a resource authorization request from a VNFM, the resource authorization request carrying an indicator of a resource pool indication parameter. The indicator includes a resource pool indication parameter of resource pools of a first type or a second type. The resource pools of the first type represent resource pools to be authorized (i.e., the resource pools corresponding to the designated resource pool indication parameter), and the resource pools of the second type represent resource pools incapable of being authorized (i.e., the resource pools corresponding to the excluded resource pool indication parameter).

Step S122: determining, by the NFVO, whether or not the resource pool corresponding to the indicator is capable of being authorized in accordance with the indicator, so as to acquire a resource authorization result.

Here, the step of determining, by the NFVO, whether or not the resource pool corresponding to the indicator is capable of being authorized in accordance with the indicator so as to acquire a resource authorization result includes determining, by the NFVO, whether or not the resource pool corresponding to the resource pool indication parameter designated by the VNFM or the resource pool other than that corresponding to the excluded resource pool indication parameter is capable of being authorized, so as to acquire the resource authorization result.

Step S123: generating, by the NFVO, a resource authorization response in accordance with the resource authorization result.

Step S124: transmitting, by the NFVO, the resource authorization response to the VNFM.

The present disclosure further provides in some embodiments a resource authorization method for deployment of a VNF, which includes the following steps.

Step S131: receiving, by an NFVO, a resource authorization request from a VNFM.

Step S132: determining, by the NFVO, a resource authorization result in accordance with the resource authorization request.

Here, in the case that no indicator of a resource pool indication parameter is carried in the resource authorization request, the step of determining, by the NFVO, the resource authorization result in accordance with the resource authorization request includes, in response to the resource authorization request, determining an indication parameter of one or more available resource pools as the resource authorization result. The available resource pools may be remaining resource pools that meet a resource authorization requirement, and the remaining resource pools that meet the resource authorization requirement may be resource pools other than the reserved resource pools that meet the resource authorization requirement.

Here, in the case that the indicator of the resource pool indication parameter is carried in the resource authorization request, the step of determining, by the NFVO, the resource authorization result in accordance with the resource authorization request includes determining, by the NFVO, whether or not the resource pool corresponding to the indicator is capable of being authorized in accordance with the indicator, so as to acquire the resource authorization result. The indicator includes a resource pool indication parameter of resource pools of a first type or a second type, the resource pools of the first type represent resource pools to be authorized, and the resource pools of the second type represent resource pools incapable of being authorized.

Here, the NFVO may determine whether or not the resource pool corresponding to the resource pool indicator parameter designated by the VNFM or the resource pool other than that corresponding to the excluded resource pool indicator parameter designated by the VNFM is capable of being authorized, so as to acquire the resource authorization result. The resource authorization result is used to indicate whether or not to authorize the resource pool corresponding to the resource pool indicator parameter designated by the VNFM or the resource pool other than that corresponding to the resource pool indicator parameter designated by the VNFM.

Step S133: generating, by the NFVO, a resource authorization response in accordance with the resource authorization result.

Step S134: transmitting, by the NFVO, the resource authorization response to the VNFM.

With respect to the defects in the related art, the present disclosure provides in some embodiments a resource authorization method for deployment of a VNF. In the related art, a VNFM has no authority to decide a resource pool to which is a requested resource belongs. However, in the embodiments of the present disclosure, in the case that the VNFM requests the resource to an NFVO, a resource pool indication parameter (VIMID) may be carried in a resource authorization request, so that the NFVO may allocate the requested resource to a designated resource pool. In the case the case that the resource pool indication parameter of the designated resource pool does not meet a predetermined condition, the resource authorization request may be rejected by the NFVO. Here, in the case that the resource pool indication parameter of the designated resource pool does not meet the predetermined condition, there at least exist the following two situations: the resource pool does not include sufficient resources, and the VNFM has no authority to use the resource pool.

As shown in FIG. 2, the resource authorization method includes the following steps.

Step S201: reporting, by a resource pool 1, a resource indicator to the VNFM. Here, the resource pool 1 may report the resource indicator to the VNFM periodically, non-periodically or on the basis of a request from the VNFM. The resource indicator may carry its CPU load, e.g., 20%.

Step S202: determining, by the VNFM, there is a resource request in accordance with the resource indicator. Here, in the case that the VNFM finds that there is a new computing job, it is necessary for the VNFM to request a new resource to the NFVO, i.e., there is the resource request (or extension request). The CPU load of the resource pool 1 is relatively low (e.g., smaller than 40% of a predetermined threshold), the resource may be derived from the resource pool 1, i.e., the newly requested resource may be designated in the resource pool 1.

Step S203: transmitting, by the VNFM, a resource authorization request carrying a resource pool indication parameter to the NFVO. Here, during the implementation, the resource pool indication parameter may be represented by an attribute of the resource pool. For example, the resource pool indication parameter may include identification (ID) about the resource pool, or a name or type of the resource pool. In a possible embodiment of the present disclosure, the resource pool indication parameter may be the identification information about the resource pool 1.

Step S204: authorizing, by the NFVO, the resource in accordance with the resource authorization request. Here, in a possible embodiment of the present disclosure, the NFVO may not authorize the resource in accordance with the resource authorization request. Generally, the reason that the NFVO does not authorize the resource mainly lies in that the resource pool indication parameter does not meet a predetermined condition. For example, the predetermined condition may include that resources in the resource pool corresponding to the resource pool indication parameter have already been occupied, or are incapable of being re-allocated (e.g., although there are unallocated resources in the resource pool, these unallocated resources are reserved resources).

Step S205: transmitting, by the NFVO, a resource authorization result to the VNFM. Here, the resource authorization result is used to indicate whether or not the resource authorization request is agreed. Generally, apart from the resource authorization result, the NFVO may also transmit identification (ID) information about a resource pool in which the resource is deployed to the VNFM. In Step S205, the resource authorization result indicates that the resource authorization request is agreed, and the identification information about the resource pool indicates the resource pool 1.

Step S206: using, by the VNFM, the resource in accordance with the identification information about the resource pool in the resource authorization result. Here, the VNFM may use the resource in the resource pool 1.

With respect to the above defects in the related art, the present disclosure further provides in some embodiments a resource authorization method for deployment of a VNF. In the related art, it is impossible for a VNFM to deploy the VNF across resource pools. On the basis of the resource pool indication parameter proposed in Scheme 2, another parameter, i.e., a list of excluded resource pools (ExVIMID List), may be added. The list may contain one or more excluded resource pool indication parameters (ExVIMID). In the case that there is a resource pool meeting a predetermined condition other than those in the list, a resource may be deployed in the corresponding resource pool. In the case that the list does not meet the predetermined condition, an NFVO shall reject a resource authorization request.

Figure 3:
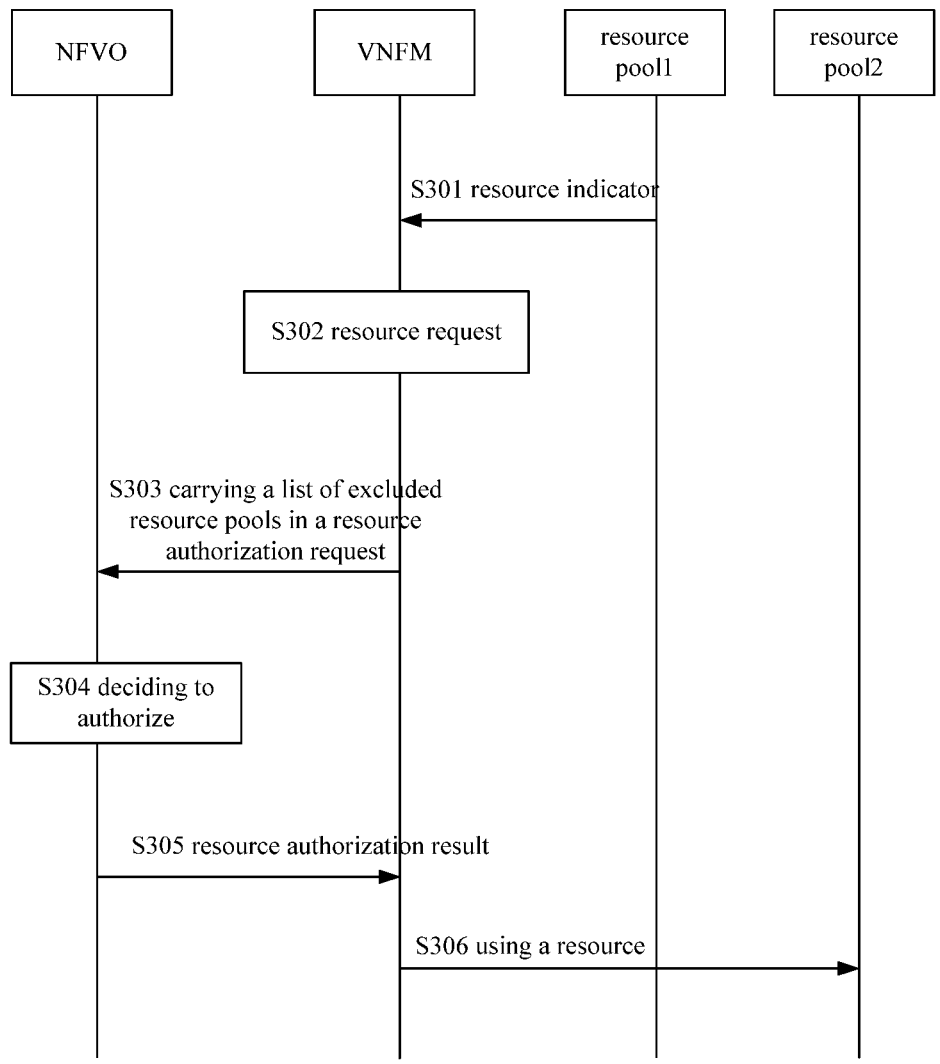
FIG. 3 is a flow chart of yet another resource authorization method for deployment of a VNF according to one embodiment of the present disclosure.

As shown in FIG. 3, the resource authorization method includes the following steps.

Step S301: transmitting, by a resource pool 1, a resource indicator to the VNFM. Here, the resource pool 1 may report the resource indicator to the VNFM periodically, non-periodically or on the basis of a request from the VNFM. The resource indicator may carry its CPU load, e.g., 80%.

Step S302: determining, by the VNFM, that there is a resource request in accordance with the resource indicator. Here, in the case that the VNFM finds that there is a new computing job, it is necessary for the VNFM to request a new resource to the NFVO. The CPU load of the resource pool 1 is too large (up to 80%) or the requested new resource is intended to be deployed within a resource pool different from an original resource for remote disaster recovery, so the newly-designated resource pool shall not include the resource pool 1.

Step S303: transmitting, by the VNFM, a resource authorization request carrying a resource pool indication parameter to the NFVO. Here, during the implementation, the resource pool indication parameter may be represented by an attribute of the resource pool. For example, the resource pool indication parameter may include identification (ID) about the resource pool, or a name or type of the resource pool. The resource authorization request contains identification information about the excluded resource pool 1 (i.e., an excluded resource pool indication parameter).

Step S304: authorizing, by the NFVO, the resource in accordance with the resource authorization request. Here, the NFVO may parse the resource authorization request, determine the identification information about the resource pool 1 as the excluded resource pool indication parameter, and authorize the resource in a resource pool 2 different from the resource pool 1.

Here, in a possible embodiment of the present disclosure, the NFVO may not authorize the resource in accordance with the resource authorization request. Generally, the reason that the NFVO does not authorize the resource mainly lies in that the resource pool indication parameter does not meet a predetermined condition. For example, the predetermined condition may include that resources in the resource pool corresponding to the resource pool indication parameter have already been occupied, or are incapable of being re-allocated (e.g., although there are unallocated resources in the resource pool, these unallocated resources are reserved resources).

Step S305: transmitting, by the NFVO, a resource authorization result to the VNFM. Here, the resource authorization result is used to indicate whether or not the resource authorization request is agreed. Generally, apart from the resource authorization result, the NFVO may also transmit identification (ID) information about a resource pool in which the resource is deployed to the VNFM. In Step S305, the resource authorization result indicates that the resource authorization request is agreed, and the identification information about the resource pool indicates the resource pool 2.

Step S306: using, by the VNFM, the resource in accordance with the identification information about the resource pool in the resource authorization result. Here, the VNFM may use the resource in the resource pool 2.

As mentioned hereinbefore, in the case that the VNFM requests the resource to the NFVO, the designated resource pool indication parameter (the identification information about the resource pool 1) or the list of the excluded resource pools (the identification information about the resource pool 1) may be carried in the resource authorization request. In other words, in the case that the VNFM requests the resource to the NFVO, the following optional parameters may be carried in the resource authorization request: 1) the resource pool indication parameter, and 2) the list of the excluded resource pools. In the case that the designated resource pool indication parameter does not meet the predetermined condition, the NFVO shall reject the resource authorization request. In the case that the resource authorization request does not carry the resource pool indication parameter, the resource may be allocated by the NFVO. The list may include one or more excluded resource pool indication parameters. In the case that the designated list does not meet the predetermined condition, the NFVO shall reject the resource authorization request. The designated resource pool indication parameter and the list of the excluded resource pools cannot be carried simultaneously in the resource authorization request. Through these two parameters, it is able to deploy the VNF across the resource pools in two scenarios. In Scenario 1, in the case that the newly-added resource is required to be located within a resource pool identical to the original resource, the resource pool indication parameter may be carried in the resource authorization request, and the resource pool identical to that used previously may be selected (as shown in FIG. 2). In Scenario 2, in the case that the newly-added resource is required to be located within a resource pool different from the original resource, the list of the excluded resource pools may be carried in the resource authorization request, and this list is used to indicate the excluded resource pools (as shown in FIG. 3).

In the related art, the VNFM does not know a resource occupation condition of each resource pool, and does not have authority to decide the resource pool to which the requested resource belongs. However, in the embodiments of the present disclosure, the resource pool indication parameter is carried in the resource authorization method. In the case that the resource pool indication parameter from the VNFM meets the predetermined condition, the NFVO may deploy the requested resource and the original resource in an identical resource pool. Otherwise, the NFVO may reject the resource authorization request. In the case that the resource pool indication parameter is not carried in the resource authorization request, the resource may be allocated by the NFVO.

In the related art, it is impossible for the VNFM to deploy the VNF across the resource pools. However, in the embodiments of the present disclosure, the list of the excluded resource pools is carried in the resource authorization request. In the case that it is necessary to deploy the requested resource in a resource pool different from the original resource, the excluded resource pool indication parameter may be added into the list. In the case that there is a resource pool not contained in the list and meeting the predetermined condition, the requested resource may be deployed in the corresponding resource pool. Otherwise, the NFVO may reject the resource authorization request.

The present disclosure further provides in some embodiments a resource authorization system for deployment of a VNF, including a VNFM and an NFVO. Units of the VNFM (e.g., a first determination unit, a first transmission unit, a first reception unit and a processing unit) and modules of each units may be implemented through a processor of the VNFM, and units of the NFVO (e.g., a second reception unit, a second determination unit, a generation unit and a second transmission unit) may be implemented through a processor of the VFVO. Of course, these units may also be implemented through a logic circuit. The processor may be a CPU, a Micro Processing Unit (MPU), a Digital Signal Processor (DSP) or a Field Programmable Gate Array (FPGA).

Figure 4:
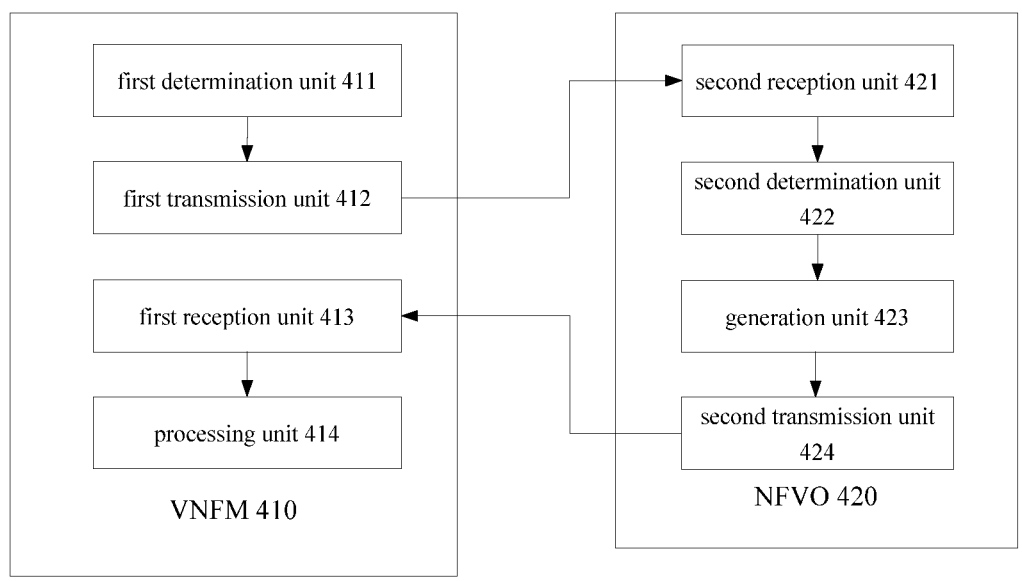
FIG. 4 is a schematic view showing a resource authorization system for deployment of a VNF according to one embodiment of the present disclosure.

As shown in FIG. 4, the resource authorization system for the deployment of the VNF includes a VNFM 410 and an NFVO 420. The VNFM includes a first determination unit 411, a first transmission unit 412, a first reception unit 413 and a processor unit 414. The NFVO 420 includes a second reception unit 421, a second determination unit 422, a generation unit 423 and a second transmission unit 424.

The first determination unit 411 is configured to determine whether or not there is a resource request. The first transmission unit 412 is configured to, in the case that there is the resource request, transmit a resource authorization request to the NFVO. An indicator of a resource pool indication parameter is carried in the resource authorization request. Of course, no indicator of the resource pool indication parameter may be carried in the resource authorization request. At this time, an indication parameter of an available resource pool may be determined as the resource authorization result in response to the resource authorization request.

The second reception unit 421 is configured to receive a resource authorization response from the NFVO. The indicator of the resource pool indication parameter is carried in the resource authorization request. Here, the indicator includes a resource pool indication parameter of resource pools of a first type or a second type, the resource pools of the first type represent resource pools to be authorized, and the resource pools of the second type represent resource pools incapable of being authorized.

The second determination unit 422 is configured to determine a resource authorization result in accordance with the resource authorization request. Here, in the case that the indicator of the resource pool indication parameter is carried in the resource authorization request, the second determination unit 422 is further configured to determine whether or not the resource pool corresponding to the indicator is capable of being authorized in accordance with the indicator, so as to obtain the resource authorization result. At this time, the resource authorization result is used to indicate whether or not to authorize the resource pool designated by the VNFM. To be specific, the resource authorization result is used to indicate whether or not to authorize a resource pool corresponding to the resource pool indication parameter designated by the VNFM or a resource pool other than the resource pool corresponding to the excluded resource pool indication parameter.

Here, in the case that the indicator of the resource pool indication parameter is not carried in the resource authorization result, the second determination unit 422 is further configured to, in response to the resource authorization request, determine an indication parameter of an available resource pool as the resource authorization result.

The generation unit 423 is configured to generate a resource authorization response in accordance with the resource authorization result. The second transmission unit 424 is configured to transmit the resource authorization response to the VNFM. The first reception unit 413 is configured to receive the resource authorization response from the NFVO, and the resource authorization response contains the resource authorization result. In the case that the indicator of the resource pool indication parameter is carried in the resource authorization request, the resource authorization result is used to indicate whether or not to authorize the resource pool designated by the VNFM. The processing unit 414 is configured to process the resource authorization result.

In a possible embodiment of the present disclosure, the first determination unit includes a reception module and a determination module. The reception module is configured to receive a resource indicator from the resource pool, and the resource indicator at least carries identification information about the resource pool. The determination module is configured to determine whether or not there is the resource request in accordance with the resource indicator.

In a possible embodiment of the present disclosure, in the case that the first determination unit includes the reception module and the determination module, the VNFM may further include a determination unit and a carrying unit. The determination unit is configured to, in the case that there is the resource request, determine the identification information about the resource pool as the resource pool indication parameter of the resource pool of the first type. The carrying unit is configured to enable the identification information about the resource pool to be carried in the resource authorization request.

In a possible embodiment of the present disclosure, the processing unit is further configured to, in the case that the resource authorization result indicates that the resource pool designated by the VNFM is to be authorized, calculate a resource, and allocate the resource to the resource pool.

It should be appreciated that, the resource authorization system is described in a way similar to the above-mentioned resource authorization methods with an identical beneficial effect. In addition, any details not included in the embodiments involving the system may refer to those mentioned in the embodiments involving the resource authorization methods.

It should be further appreciated that, the above technical solutions are described on the basis of terms defined in an ETSI standard, i.e., the resource authorization request is generated by the VNFM, the resource authorization response is generated by the NFVO, and an object to be created and extended is the VNF. It should be further appreciated that, the terms defined in an International Telecommunication Union (ITU) standard may also be applied. For example, the steps performed by the VNFM may also be performed by a Management of Virtualization of Control Network Entity (VCNM), the steps performed by the NVFO may also be performed by an orchestrator, and the object to be created and extended may also be a Virtualization of Control Network Entity (VCN).

It should be appreciated that, in the case that the resource authorization methods are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a magnetic disk or an optical disk. Hence, the present disclosure may not be limited to any specific combination of hardware and software.

Correspondingly, the present disclosure further provides in some embodiments a computer storage medium storing therein a computer-executable instruction. The computer-executable instruction is configured to implement the resource authorization method.

Correspondingly, the present disclosure further provides in some embodiments an VNFM, including a first processor and a first storage medium storing therein a computer-executable instruction. The first processor is configured to execute the computer-executable instruction, so as to: determine whether or not there is a resource request; in the case that there is the resource request, transmit a resource authorization request to an NFVO; receive a resource authorization response from the NFVO, the resource authorization response containing a resource authorization result; and process the resource authorization result.

Correspondingly, the present disclosure further provides in some embodiments an NFVO, including a second processor and a second storage medium configured to store therein a computer-executable instruction, wherein the second processor is configured to execute the computer-executable instruction, so as to: receive a resource authorization request from a VNFM; determine a resource authorization result in accordance with the resource authorization request; generate a resource authorization response in accordance with the resource authorization result; and transmit the resource authorization response to the VNFM.

It should be appreciated that, such expressions as "one embodiment" and "the embodiment" in the entire description mean that the specific features, structures or characteristics are included in at least one embodiment of the present disclosure, so these expressions do not always refer to the same embodiment. In addition, the specific features, structures or characteristics may be combined in one or more embodiments in any appropriate form. It should be further appreciated that, serial numbers of the steps are not used to define an order thereof, and instead, the order of the steps shall be determined in accordance with the functions as well as internal logic thereof. In addition, serial numbers of the embodiments are for illustrative purposes only, and none of them is superior to the others.

Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

It should be further appreciated that, the device and method may be implemented in any other ways. For example, the embodiments for the device are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together. Each unit may be implemented in the form of hardware, or hardware plus a software function unit.

It should be further appreciated that, all or parts of the steps in the method may be implemented by related hardware using a program stored in a computer-readable storage medium. The program is executed so as to perform the steps. The storage medium includes any medium capable of storing therein program codes, e.g., a mobile storage device, a ROM, a magnetic disk or an optical disk. The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a mobile storage device, a ROM, a RAM, a magnetic disk or an optical disk.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

INDUSTRIAL APPLICABILITY

According to the embodiments of the present disclosure, the VNFM determines whether or not there is the resource request. In the case that there is the resource request, the VNFM transmits the resource authorization request to the NFVO. Next, the VNFM receives the resource authorization response from the NFVO, and the resource authorization response contains the resource authorization result. Then, the VNFM processes the resource authorization result. As a result, it is able to provide the NFVO with authority to decide whether or not to authorize the resource, thereby to enable the VNFM to have authority to use the resource after authorization.

What is claimed is:

1. A resource authorization method for deployment of a Virtual Network Function (VNF), comprising steps of: determining, by a Virtual Network Function Manager (VNFM), whether or not there is a resource request; in the case that there is the resource request, transmitting, by the VNFM, a resource authorization request to a Network Function Virtualization Orchestrator (NFVO); receiving, by the VNFM, a resource authorization response from the NFVO, the resource authorization response containing a resource authorization result; and processing, by the VNFM, the resource authorization result, wherein the resource authorization request carries or does not carry an indicator of a resource pool indication parameter, the indicator comprises a resource pool indication parameter of resource pools of a first type or a second type, the resource pools of the first type represent resource pools to be authorized, and the resource pools of the second type represent resource pools incapable of being authorized.

2. The resource authorization method according to claim 1, wherein the resource authorization result is used to indicate whether or not the resource pools designated by the VNFM are authorized or indicate the resource pools meet a request condition.

3. The resource authorization method according to claim 2, wherein the step of determining whether or not there is the resource request comprises: receiving a resource indicator from each resource pool, the resource indicator at least carrying identification information about the resource pool, and determining, by the VNFM, whether or not there is the resource request in accordance with the resource indicator; or determining, by the VNFM, whether or not there is the resource request in accordance with a predefined policy.

4. The resource authorization method according to claim 3, further comprising: in the case that there is the resource request, determining, by the VNFM, the identification information about the resource pool as the resource pool indication parameter of the resource pools of the first type; and enabling, by the VNFM, the identification information about the resource pool to be carried in the resource authorization request.

5. The resource authorization method according to claim 2, wherein the step of processing, by the VNFM, the resource authorization result comprises, in the case that the resource authorization result indicates that the resource pool designated by the VNFM is to be authorized, using, by the VNFM, a resource in accordance with the resource authorization result.

6. A non-transitory computer storage medium storing therein a computer-executable instruction, wherein the non-transitory computer-executable instruction is executed so as to implement the resource authorization method according to claim 1.

7. A Virtual Network Function Manager (VNFM), comprising a first processor and a first storage medium configured to store therein a computer-executable instruction, wherein the first processor is configured to execute the computer-executable instruction, so as to: determine whether or not there is a resource request; in the case that there is the resource request, transmit a resource authorization request to a Network Function Virtualization Orchestrator (NFVO); receive a resource authorization response from the NFVO, the resource authorization response containing a resource authorization result; and process the resource authorization result, wherein the resource authorization request carries or does not carry an indicator of a resource pool indication parameter, the indicator comprises a resource pool indication parameter of resource pools of a first type or a second type, the resource pools of the first type represent resource pools to be authorized, and the resource pools of the second type represent resource pools incapable of being authorized.

8. The VNFM according to claim 7, wherein the resource authorization result is used to indicate whether or not the resource pools designated by the VNFM are authorized or indicate the resource pools meet a request condition.

9. The VNFM according to claim 8, wherein the step of determining whether or not there is the resource request comprises: receiving a resource indicator from each resource pool, the resource indicator at least carrying identification information about the resource pool, and determining, by the VNFM, whether or not there is the resource request in accordance with the resource indicator; or determining, by the VNFM, whether or not there is the resource request in accordance with a predefined policy.

10. The VNFM according to claim 9, the first processor is configured to execute the computer-executable instruction, so as further to: in the case that there is the resource request, determining, by the VNFM, the identification information about the resource pool as the resource pool indication parameter of the resource pools of the first type; and enabling, by the VNFM, the identification information about the resource pool to be carried in the resource authorization request.

11. The VNFM according to claim 8, wherein the step of processing, by the VNFM, the resource authorization result comprises, in the case that the resource authorization result indicates that the resource pool designated by the VNFM is to be authorized, using, by the VNFM, a resource in accordance with the resource authorization result.

* * * * *